3,129,256
ALKYLATION OF BENZENE WITH PROPYLENE IN THE PRESENCE OF A CATALYST CONTAINING TITANIUM TETRACHLORIDE, ALKYL ALUMINUM SESQUICHLORIDE, AND OXYGEN

Russell G. Hay, Gibsonia, Leo F. Meyer, Pittsburgh, and Charles M. Selwitz, Pitcairn, Pa., assignors to Gulf Research & Development Company, Pittsburgh, Pa., a corporation of Delaware
No Drawing. Filed Dec. 1, 1959, Ser. No. 856,351
3 Claims. (Cl. 260—671)

This invention relates to a process for preparing an alkyl aromatic.

Alkyl aromatics are prepared in accordance with the process of this invention by reacting an alkylatable aromatic compound with an olefin in the presence of a catalyst mixture containing an organo aluminum halide and a heavy metal halide and a selected amount of a material containing active oxygen. Operation in accordance with such process results in a product predominating in an alkyl aromatic hydrocarbon having one more alkyl group than the reactant aromatic hydrocarbon, with the added alkyl having the same number of carbon atoms as the alkylating olefin.

Any alkylatable aromatic hydrocarbon can be employed in the reaction, whether it be solid or liquid, mononuclear, dinuclear or polynuclear, substituted or unsubstituted. Among the mononuclear aromatic hydrocarbons which are preferred are benzene and substituted benzenes containing as substituents from one to three alkyl radicals having from one to 20 carbon atoms, preferably from one to 10 carbon atoms. Among the dinuclear alkylatable aromatic hydrocarbons which are preferred are naphthalene and substituted naphthalenes containing as substituents from one to four alkyl radicals having from one to 20 carbon atoms, preferably from one to 10 carbon atoms. Examples of alkylatable aromatic compounds which can be employed are benzene, toluene, ethylbenzene, xylenes, tetralin, cumene, diisopropylbenzenes, n-octylbenzene, 2-phenyl-4-ethyloctadecane, naphthalenes, isopropylnaphthalenes, diisopropylnaphthalenes, 1-ethyl-6-isobutylnaphthalene, 1,2,4-triisopropylbenzene, phenanthrene, etc. In the event the alkylatable aromatic compound is normally liquid, no extraneous solvent need be employed in the reaction. With a normally solid alkylatable hydrocarbon an inert solvent such as heptane, octane, isooctane, hexane, etc. can be employed.

While olefins having from two and up to 30 carbon atoms can be employed in the alkylation reaction, olefins having from three to 20 carbon atoms are preferred. Examples of olefins which can be employed are ethylene, propylene, isobutylene, butene-1, cis-butene-2, trans-butene-2, pentene-1, cyclopentene, cyclohexene, cycloheptene, 4-methylcyclooctene, 2-methylbutene-1, 2-methylbutene-2, 3-methylbutene-1, cis-pentene-2, trans-pentene-2, hexene-1, cis-hexene-2, trans-hexene-2, 5,6-dimethylheptene-1, tetrapropylene, pentadecene-1, 6-cyclohexyldodecene-1, 4-n-nonyldodecene-1, n-tetracosene-1, n-heptacosene-1, 13-cyclopentylpentacosene, etc.

The amount of olefin which need be present at any moment during the reaction can of course be small. While the total amount of olefin which will be required for the reaction can be added to the reaction zone initially with the alkylatable aromatic compound this is not preferred because of the tendency of some of the olefin to polymerize. Desirably a small amount of olefin is added to the reaction zone as the reaction progresses and until the reaction ceases. The total amount of olefin consumed will of course vary with the alkylatable aromatic compound and olefin employed, the pressure, temperature, reaction time, catalyst, etc. In general the total amount of olefin employed can be about 0.1 to about 1.5 or higher mols preferably about 0.2 to about 0.6 mol per mol of alkylatable aromatic compound.

The organo aluminum halides which forms one of the active agents in the catalyst system employed can be defined by the formula $R_aAlX_b$, wherein R can be an aromatic radical such as phenyl, tolyl, xylyl, etc.; or an alkyl group having from one to 10 carbon atoms, preferably from one to four carbon atoms, such as methyl, ethyl, propyl, isopropyl, n-butyl, isobutyl, etc.; X is a halogen atom selected from the group consisting of fluorine, chlorine, bromine and iodine; and $a$ and $b$ are values from one to two. Examples of organo aluminum halides which can be employed are ethylaluminum sesquichloride, methylaluminum sesquichloride, ethylaluminum sesquibromide, isobutylaluminum sesquichloride, diethylaluminum chloride, ethylaluminum sesquifluoride, n-butylaluminum dibromide, decylaluminum sesquichloride, methylaluminum sesquiiodide, etc.

The heavy metal halide which is employed in conjunction with the organo aluminum halide as the second active agent in the catalyst system is critical in order to obtain the desired alkylation reaction of this invention. As shown in our copending applications Serial Nos. 856,349 and 856,350, filed concurrently herewith, in order to obtain a product alkyl aromatic wherein the added alkyl has the same number of carbon atoms as the alkylating olefin, the heavy metal halide must be one wherein the metallic component thereof is selected from the group consisting of titanium, zirconium, hafnium, molybdenum, antimony and tin. Heavy metal halides including salts such as ferric chloride, thorium chloride, silicon chloride, chromium chloride and chromium oxygen chloride were shown to be unsatisfactory.

In order to obtain the desired results of this invention the molar ratio of heavy metal halide to organo aluminum halide can be about one to one, but no more than about nine to one, but preferably is about three to one to about four to one. The total amount of catalyst, though not critical, is about 0.1 millimol of catalyst per mol of alkylatable aromatic compound, preferably about one to about 10 millimols of catalyst per mol of alkylatable aromatic compound.

We have found that a product predominating in an alkyl aromatic having but one alkyl more than the reactant aromatic can be obtained by reacting the defined alkylatable aromatic hydrocarbon with the defined olefin in the presence of such catalyst system and additionally in the presence of a material containing active oxygen. The olefin is added to the catalyst mixture and alkylatable aromatic continuously, preferably at about a uniform rate, throughout the reaction period. The material containing active oxygen is added continuously or intermittently to the reaction zone and concurrently or approximately concurrently with the olefin. The total amount of oxygen-containing material (material containing active oxygen) which is added to the reaction zone during the course of the reaction is about 0.2 to about two mole per mol of combined catalyst. The material containing oxygen can be oxygen itself or any compound containing an active oxygen. Among the oxygen-containing materials which can be used are oxygen itself, water, carbon monoxide, carbon dioxide, esters such as ethyl acetate, peroxides such as di-tertiary-butyl peroxide, aldehydes such as acetaldehyde and peraldehyde, ketones such as acetone and methyl ethyl ketone, organic acids such as formic, acetic and butyric, inorganic acids such as nitric and sulfuric peracids such as peracetic acid and perchloric acid, alcohols such as methanol, ethanol, etc.

The reaction pressure is not critical and can be varied over a wide range, for example from about atmospheric to about 500 pounds per square inch gauge or higher. The temperature similarly is not critical and can be varied over a wide range. Thus the temperature can be from about 20° to about 220° C. Reaction time is not critical and can be from about 5 minutes to about 4 hours.

After the reaction has been completed, the catalyst is deactivated and further reaction terminated in any conventional manner, for example, by hydrolyzing the same with a compound containing an active hydrogen such as water or methanol. The products can be recovered by the simple expedient of distillation.

The invention can further be illustrated by reference to the following examples. Example I below shows the distribution of products obtained when an oxygen-containing material is not employed during the reaction.

EXAMPLE I 352 grams of benzene were placed in a flask having an inert atmosphere and 1.11 millimols of ethyl aluminum sesquichloride per mol of benzene and 3.32 millimols of titanium tetrachloride per mol of benzene were added thereto. The system was then pressured and maintained at about 150 pounds per square inch gauge with a propane-propylene mixture, from which oxygen and oxygen-containing compounds were removed. A continuous bleed was maintained on the system throughout the run in order to remove therefrom the unreactive constituents. The mixture analyzed as follows in percent by weight.

| | |
|---|---|
| Argon | 0.02 |
| Nitrogen | 0.51 |
| Hydrogen | None |
| Methane | 0.40 |
| Ethane | 4.00 |
| Propane | 26.10 |
| Propylene | 68.17 |
| Butanes | 0.32 |

The reaction was permitted to proceed over a period of 45 minutes at a temperature of 116° C. At the end of the reaction period the catalyst was deactivated by hydrolyzing the same with methanol and the individual components recovered by distillation. 675 grams of propylene were absorbed during the reaction. 1030 grams of product was obtained, of which 50 percent by weight was 1,2,4,5-tetraisopropylbenzene and 50 percent by weight of 1,3,5-triisopropylbenzene.

Note from the above that with no oxygen-containing compound present no monoalkylbenzene (cumene) was obtained. In the examples below, which were run in a manner similar to Example I, the significant change which occurs in the presence of an oxygen-containing material is apparent. The composition of the gases in percent by weight, employed in the examples was as follows:

| Compound | Example II | Example III | Example IV |
|---|---|---|---|
| Carbon dioxide | 0.16 | 0.12 | 0.08 |
| Argon | 0.09 | 0.08 | 0.12 |
| Oxygen | 0.08 | 0.05 | 0.02 |
| Nitrogen | 1.56 | 1.22 | 0.88 |
| Hydrogen | 1.05 | 0.50 | |
| Methane | 3.90 | 2.00 | 0.93 |
| Ethane | 4.92 | 4.60 | 4.30 |
| Propane | 23.69 | 24.50 | 25.43 |
| Butanes | 0.29 | 0.30 | 0.28 |
| Propylene | 64.26 | 66.73 | 67.93 |

In Example II the oxygen-containing compounds were present during the reaction in a molar ratio of two mols per mol of combined catalyst, in Example III 1.5 mol per mol of combined catalyst and in Example IV 0.82 mol per mol of combined catalyst. In each case 0.553 millimol of ethyl aluminum sesquichloride per mol of benzene and 1.66 millimols of titanium tetrachloride per mol of benzene were employed. In Example II the reaction temperature ranged from 60° to 100° C., in Example III the temperature was 60° C. and in Example IV the temperature ranged from 60° to 140° C. In each case the reaction time was one hour. The total product obtained in Examples II, III and IV was, respectively, 390, 400 and 430 grams. The results are set forth below in Table I.

*Table I*

| Product Composition | Example II | Example III | Example IV |
|---|---|---|---|
| Benzene | 80 | 75 | 62 |
| Cumene | 17 | 20 | 30 |
| Diisopropylbenzenes | 2 | 3 | 5 |
| Triisopropylbenzenes | 1 | 2 | 3 |

From the above it is apparent that the presence of a small amount of a compound containing active oxygen in the reaction system produced a profound change in product distribution. Thus in Example I wherein no oxygen-containing compound was present the alkylated aromatic product contained polyalkylated aromatics. In Examples II, III and IV, however, wherein only a small amount of oxygen and carbon dioxide was present, the alkylated product was predominantly a monoalkylated aromatic.

In order to determine what materials contain an active oxygen and can therefore be used as the oxygen-containing material in the process of this invention, the following test can be employed. At least 0.1 mol of the material being evaluated is led into a 100 milliliter flask containing 25 milliliters of a one percent solution of phenyl isopropyl potassium in dibutyl ether under an atmosphere of dry nitrogen. The disappearance of the red color of the phenyl isopropyl potassium indicates that the material added is an active oxygen-containing material.

Obviously, many modifications and variations of the invention, as hereinabove set forth, can be made without departing from the spirit and scope thereof, and therefore only such limitations should be imposed as are indicated in the appended claims.

We claim:

1. A process for alkylating an alkylatable aromatic hydrocarbon which comprises reacting benzene with propylene in the presence of a catalyst system containing titanium tetrachloride and an alkyl aluminum sesquichloride in a molar ratio of about 1:1 to about 9:1, wherein said alkyl substituent has from one to four carbon atoms, with the total amount of catalyst being at least about 0.1 millimol per mol of said alkylatable aromatic compound, and about 0.2 to about two mols of a material containing active oxygen selected from the group consisting of oxygen and carbon dioxide per mol of combined catalyst at a pressure of about atmospheric to about 500 pounds per square inch gauge, a temperature of about 20° to about 220° C. for a period of from about five minutes to about four hours.

2. A process for alkylating an alkylatable aromatic hydrocarbon which comprises reacting benzene with propylene in the presence of a catalyst system containing titanium tetrachloride and ethyl aluminum sesquichloride in a molar ratio of about 1:1 to about 9:1, with the total amount of catalyst being at least about 0.1 millimol per mol of said alkylatable aromatic compound, and about 0.2 to about two mols of oxygen per mol of combined catalyst at a pressure of about atmospheric to about 500 pounds per square inch gauge, a temperature of about 20° to about 220° C. for a period of from about five minutes to about four hours.

3. A process for alkylating an alkylatable aromatic hydrocarbon which comprises reacting benzene with propylene in the presence of a catalyst system containing titanium tetrachloride and an alkyl aluminum sesquichloride in a molar ratio of about 1:1 to about 9:1, wherein said alkyl substituent has from one to four carbon atoms, with the total amount of catalyst being at least about 0.1 millimol per mol of said alkylatable aromatic compound, and about 0.2 to about two mols of oxygen per mol of combined catalyst at a pressure of about atmospheric to about 500 pounds per square inch gauge, a temperature of about 20° to about 220° C. for a period of from about five minutes to about four hours.

References Cited in the file of this patent
UNITED STATES PATENTS

| | | |
|---|---|---|
| 2,824,145 | McCall et al. | Feb. 18, 1958 |
| 2,827,446 | Breslow | Mar. 18, 1958 |
| 2,935,542 | Minckler et al. | May 3, 1960 |
| 2,031,514 | Kosmin | Apr. 24, 1962 |